(12) United States Patent
Kaufman et al.

(10) Patent No.: US 12,584,646 B2
(45) Date of Patent: Mar. 24, 2026

(54) DRIVE THROUGH WINDOW ENERGY SAVING SYSTEM

(71) Applicant: Budderfly, Inc., Shelton, CT (US)

(72) Inventors: Lee Tony Kaufman, Grafton, MA (US); Kenneth Buda, Scarsdale, NY (US); Albert Subbloie, Orange, CT (US); Jaan Leemet, Aventura, FL (US)

(73) Assignee: Budderfly, Inc., Shelton, CT (US)

( * ) Notice: Subject to any disclaimer, the term of this patent is extended or adjusted under 35 U.S.C. 154(b) by 426 days.

(21) Appl. No.: 18/192,460

(22) Filed: Mar. 29, 2023

(65) Prior Publication Data

US 2023/0314025 A1      Oct. 5, 2023

Related U.S. Application Data

(60) Provisional application No. 63/324,971, filed on Mar. 29, 2022.

(51) Int. Cl.
| | |
|---|---|
| *F24F 11/46* | (2018.01) |
| *F24F 9/00* | (2006.01) |
| *F24F 11/64* | (2018.01) |
| *G05B 19/042* | (2006.01) |
| *F24F 110/10* | (2018.01) |
| *F24F 120/10* | (2018.01) |
| *F24F 130/00* | (2018.01) |

(52) U.S. Cl.
CPC ............... *F24F 11/46* (2018.01); *F24F 9/00* (2013.01); *F24F 11/64* (2018.01); *G05B 19/042* (2013.01); *F24F 2110/10* (2018.01);

*F24F 2120/10* (2018.01); *F24F 2130/00* (2018.01); *F24F 2221/20* (2013.01); *G05B 2219/2614* (2013.01)

(58) Field of Classification Search
CPC ... F24F 11/46; F24F 11/64; F24F 9/00; G05B 19/042
USPC .......................................... 700/276
See application file for complete search history.

(56) References Cited

U.S. PATENT DOCUMENTS

| | | | | | |
|---|---|---|---|---|---|
| 5,921,036 | A | * | 7/1999 | Murphy | E04H 3/04 404/71 |
| RE47,380 | E | | 5/2019 | Bridgman et al. | |
| 12,327,230 | B1 | * | 6/2025 | Siefken | G06Q 20/20 |
| 12,381,673 | B1 | * | 8/2025 | Siefken | H04L 5/0046 |
| 12,400,279 | B2 | * | 8/2025 | Siefken | G06Q 50/12 |

FOREIGN PATENT DOCUMENTS

| | | | | | | |
|---|---|---|---|---|---|---|
| CA | | 3014322 | C | * | 3/2023 | ......... G07F 17/0014 |
| EP | | 1801341 | A1 | * | 6/2007 | ............. E05F 15/71 |
| JP | | 2004322880 | A | * | 11/2004 | ......... G07F 17/0014 |
| KR | | 101728710 | B1 | * | 4/2017 | ............. B61B 1/02 |
| WO | WO-2008029894 | A1 | * | 3/2008 | ............. G06F 30/13 |

* cited by examiner

*Primary Examiner* — Crystal J Barnes-Bullock
(74) *Attorney, Agent, or Firm* — Farber LLC

(57) ABSTRACT

A system and method of managing operation of environmental heating/cooling devices adjacent or designed to direct heated/cooled air adjacent a frequently opening/closing opening in a facility is provided. The system monitors various states and activities of the facility that result in the window/door opening/closing and employs strategic use of the additional heating/cooling device to maintain a comfortable environment adjacent the opening while avoiding unnecessary operation of the heating/cooling device.

12 Claims, 3 Drawing Sheets

DRIVE THROUGH WINDOW ENERGY SAVING SYSTEM

FIELD OF THE INVENTION

A system and method for optimizing energy efficiency for quick serve restaurants that offer drive through service in hot or cold climates through the use of energy efficient air curtains to limit entry/exist of air through the drive through window or other openings or surfaces that may affect interior temperature.

BACKGROUND OF THE INVENTION

Many restaurants, and in particular quick serve restaurants (QSR) benefit from providing drive through service with a drive through window. This is convenient for customers to get their food on the go, picking it up directly from their cars.

Take-out has also grown in popularity as some patrons are reluctant to eat indoors or mingle with other guests or simply prefer to get their food on the go. Others simply like the convenience of picking up without having to exit the car or enter the restaurant.

Most such systems in use today employ a human who collects requests via audio and then prepares the order for hand delivery through a window. Cars drive up to an ordering area and place their order whether that be through pushbutton selections and visible cues, or over a microphone talking to the attendant. They place their desired order through two-way communications with an assistant in the restaurant.

The system or the attendant then directs the cars to one of possibly multiple drive-up windows to pay and pick up their order when ready. An attendant, possibly the same one that took the order, opens a window to collect payment and another attendant in a separate window delivers the goods ordered. Alternatively, the payment and goods exchange could occur at the same window.

On very cold days, heating systems must work extra hard to keep the attendant comfortable and to keep the cold exterior air from cooling off the interior of the building. This leads to large inefficiencies. The same can be said on very hot and humid days, where air conditioning must work hard to maintain the temperature settings inside the building.

While the examples herein are drawn from QSR food delivery services, these should not be construed as limiting. Any pick-up service that includes opening doors or windows frequently to handle pick up or delivery of items can benefit from such a system. Even door entry ways for foot traffic to shopping malls and/or retail stores or other commercial locations can benefit. The main factor being that there is a large and prolonged opening between two large temperature differentials.

Existing patents, such as U.S. patent application Ser. No. 13/780,232 develop the drive through concept from ordering and food preparation or even food packaging and transportation. However, none of these offers systems and methods for energy savings with respect to operating in hot or cold climates.

As a practical solution, many facilities that have implemented such a drive-up window place a separate heating system by the window to keep the attendant from getting too cold in extreme winter temperatures.

This may be a heater that blows hot air down from the ceiling to offset or mix with cold air that would come in when the window is open. In summer months, for extreme heat and humidity, it can also be an air conditioning duct or a simple fan to prevent the heat and humidity from coming in. Further, such a system prevents odors and exhaust fumes from entering the establishment when cars drive up and idle in front of the window or other external pollutants such as dust These additional heating systems use large amounts of energy as they must quickly warm up the area and counteract what could be a relatively large temperature differential. They are frequently setup to run continuously, and this inefficient use of energy can dramatically increase the overall energy usage of the establishment and therefore the operating costs.

While some existing systems have employed things like a foot pedal for the operator to turn the system on or off, these are not ideal as they don't prepare the space for the operator before arrival. They also hamper the operator's ability to work if he must keep his foot on a pedal, and if the pedal is a switch the operator may leave it on, again leading to inefficiencies as it would make the heating or cooling system run for a longer time than is needed.

It would thus be beneficial to have a system capable of controlling the use of such heating and cooling systems in a manner that both fulfils their primary purpose of maintaining the temperature inside a building, while also maximizing energy efficiency.

SUMMARY OF THE INVENTION

A system is proposed to monitor and efficiently manage the energy use of auxiliary heating and cooling systems employed to manage the temperature in high traffic or open areas such as drive-up windows, doors, garage doors, awnings or other areas that have frequent exposure to the elements due to high traffic.

The system prevents undue effects on the indoor areas of establishments that have both a drive-up area and an interior space. In addition to providing a set temperature for the building, such a system also prevents the entry of exhaust fumes and odors from the outside into the establishment.

It is therefore an object of the invention to reduce energy losses at drive through windows.

It is a further object of the invention to maintain the drive through window area at a comfortable temperature and to minimize or reduce temperature fluctuations.

It is yet another object of the invention to provide predictive learning of how widows are open and shut at varied intervals depending on what is ordered, the time of day, and how the heating/cooling can be optimized to reduce energy costs while maintaining a comfortable environment.

These and other objects are achieved by providing a drive through window energy management system comprising a sensor which determines an open or close status change of a drive through window. An environmental temperature control device positioned to deliver heat or cooling to an area including a drive through window area and/or an area adjacent to the drive through window, the environmental temperature control device is activated by a command generated based on the sensor detecting the status change of the drive through window. The environmental temperature control device delivers heat or cooling to the area to reduce temperature changes due the drive through window being open when the sensor indicates an open status and to turn off the environmental temperature control device when the sensor indicates a closed status in order to reduce energy usage.

In certain aspects the open status change is indicative of the window being expected to be opened in the future such that the environmental temperature control device can be pre heated or pre cooled to pre heat or pre cool the area in order to reduce temperature fluctuations. In other aspects, the closed status change is indicative of the window having closed recently such that the environmental temperature control device continues to heat or cool the area for a period of time. In certain aspects, the environmental temperature control device continues to heat or cool the area until a predetermined temperature is reached. In other aspects, the drive through window is part of a facility including food and/or drink preparation and the drive through window is positioned at an opening with a bottom of the opening elevated relative to an adjacent driving surface so that a vehicle occupant can obtain food and/or drink through the drive through window. In other aspects, the environmental temperature control device includes a fan whose exhaust is oriented to deliver a hot or cold air curtain that separates an exterior zone outside the window from at least part of the facility. In still other aspects, the at least part of the facility is the area. In certain aspects, the sensor provides information indicative of an order having been placed which is indicative of an open status of the window which is an open status expected in a near future. In still other aspects, the sensor is a point of sale device which received the order. In yet other aspects, the at least one sensor includes a vehicle position sensor which identifies a vehicle adjacent or approaching the drive through window. In yet other aspects the environmental control device includes a fan and the at least one sensor is a door opening sensor which activates the fan to create an air curtain at or adjacent the drive through window. In other aspects, the system further includes a temperature sensor which allows the processor to determine temperature information indicative of a temperature of the area and wherein the command is determined based on the temperature information.

Other objects are achieved by providing a system for pre heating or cooling a drive through window area in a food or beverage service facility. The system includes configuration to determine, based on one or more sensors, an expected opening of the drive through window. The processor signals an environmental control device to pre heat or pre cool in order to deliver hot or cold air to an area at or adjacent to the drive through window. The processor delivers heated or cooled air to the area upon opening of the drive through window by a fan which creates an air curtain to reduce temperature changes between the area and an exterior area outside the drive through window. In certain aspects, the processor turns off the environmental control device after the drive through window is closed. In other aspects, the processor turns off the environmental control device after a temperature sensor indicative of a temperature at the area reaches a predetermined value. In other aspects, the expected opening is determined by an order placed through a point of sale device for food and/or drink and the environmental control device is signaled to pre heat or pre cool at a time determined based on an average time between order completion and drive through window opening such that when the drive through window opens, the environmental control device is at a temperature sufficient for the fan to deliver the heated or cooled air. In still other aspects, the actual time between order completion and opening the drive through window is determined for each order and a storage is updated with the actual time to thereby update how the average time is determined. In yet other aspects, the environmental control device is signaled to deliver heated or cooled air after a command to open the drive through window is received, but before the drive through window opens fully. In still other aspects, the environmental control device is turned off when the drive through window is closed and there is no indication of an expected opening of the window.

In still other aspects, the environmental control device is kept on when the drive through window is closed and there is a subsequent indication of an expected opening of the window in such cases where they may be a queue of cars placing orders one after the other.

In still other aspects, the environmental control device is cycles on periodically even when there is no expected opening of the system to ensure that a minimum temperature is kept in the space to avoid windows freezing shut or frosting up. This temperature can be substantially lower that the normal comfortable temperature as there is no attendant expected to be present.

Other objects of the invention and its particular features and advantages will become more apparent from consideration of the following drawings and accompanying detailed description.

DETAILED DESCRIPTION OF THE INVENTION

Figure 1:
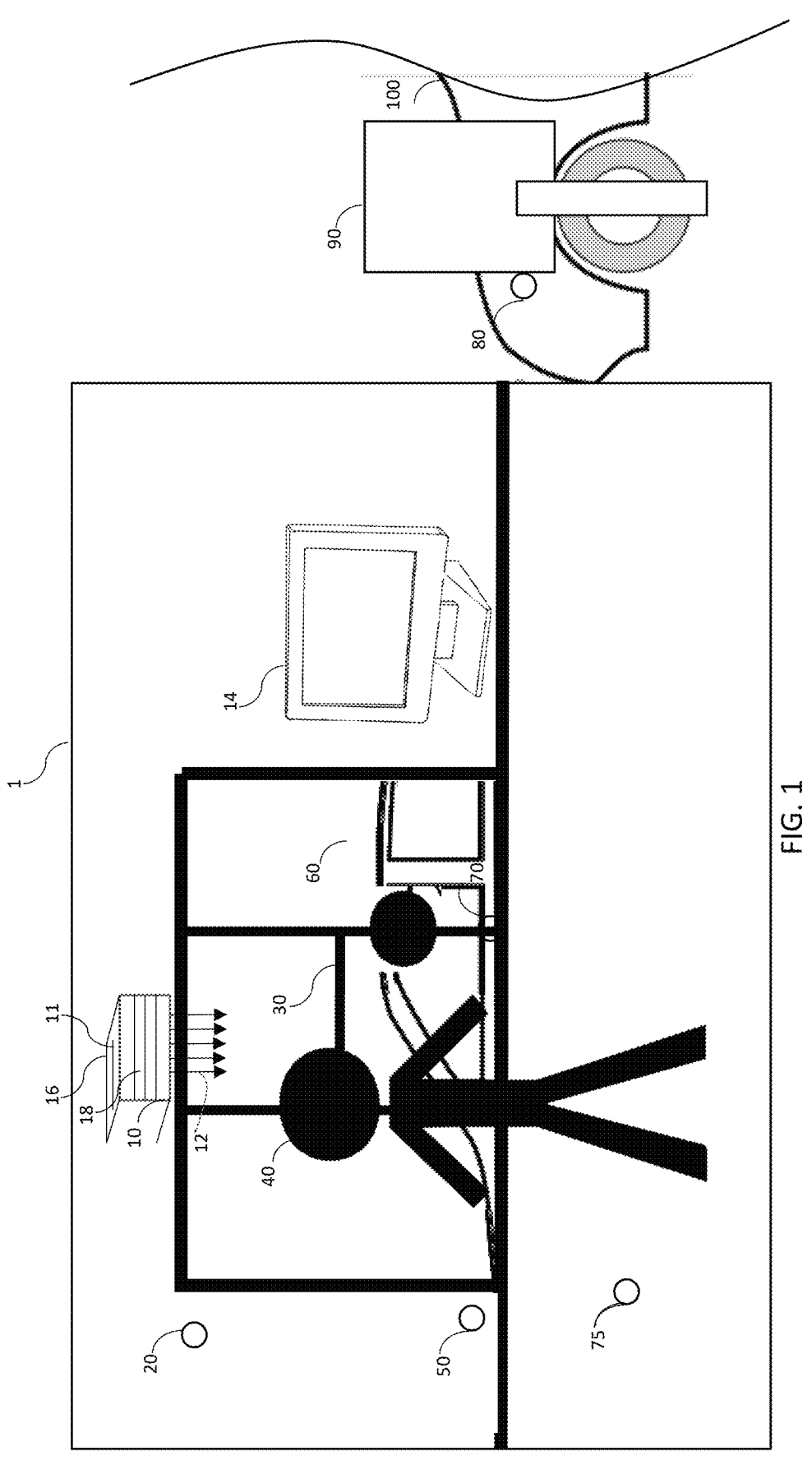
FIG. 1 is a depiction of a typical system with its various components

In some of the examples below, for simplicity, cold weather applications of the system are depicted. This should in no way be construed as limiting, and such systems can also be utilized for hot and/or humid weather.

In one configuration, a QSR that has an interior heated to 75 degrees in the indoor space where guests are present. The QSR also provides a drive-up window for payment and pick-up of orders. In such a case, every time the drive through window is opened to collect payment and deliver orders, a relatively large amount of cold air is allowed to enter the interior space that requires the heating equipment to run.

Additionally, other problems can also occur such as:

a. The window may frost up or even freeze shut;

b. Windows and handles become cold to the touch and difficult to operate;

c. When open, a blast of cold air comes in freezing the attendant and may cause a draft for indoor dining patrons; and d. Rain, snow, humidity, exhaust fumes, and other odors can also come in.

High powered heaters and cooling systems are employed to keep the temperature at a comfortable level when the window is opened to the elements. Such a system prevents the outside air from affecting the interior of the restaurant. It also keeps the window mechanisms from frosting up.

The fans of such a heater are positioned as a down draft fans to provide heat from above the window with the air circulation pushing outwards to prevent outdoor air from coming in. The positioning can be aligned so as to provide a warm airflow where most needed.

Such a system must provide sufficient heat to counter a relatively large temperature differentials. Large fans and heating elements must be used, and in many cases such systems are designed to run continuously. Such systems are typically electrical heaters or for cooling, use compressors, both of which consume large amounts of energy to meet these objectives. Any possible reduction in utilization can provide material reductions in energy costs.

The system proposed highlights a number of optimizations that are made to provide an efficient method of providing the desired function while optimizing energy cost.

Under normal operation, the traffic flow to the drive-up window may be sparse and the window can remain closed between vehicles. In such a situation, there is no need to provide a continual flow of hot air directed to the window. A periodic warm up to keep the window from frosting is sufficient.

A thermostat is employed and positioned where the attendant is to be present when serving orders. This allows the system to shut off when a stable temperature is achieved and to automatically turn on to have the space at a good temperature for when the attendant arrives. The setpoint can be set a little higher than the normal set point in the room to ensure it is a little warmer to counter the frequent opening and closing of the window.

Other triggers such as a foot pedal, a contact switch or motion sensor can also be employed to pre-warm or increase the setpoint.

Further, a variable speed motor is employed to provide a lower fan speed across the heating elements to keep some air flow on the cold window and keep the air warm in the drive-up window area, even when the window is closed.

Additionally, a set of sensors is used to predict when the system will be needed. These include a vehicle sensor that detects when a car drives up into the drive through lane and is ready to place an order. In such a case, the system pre-heats the area in anticipation of the window being opened to collect funds and deliver the order. Additional sensors that monitor the presence of the attendant, the opening and closing of the window also are used to turn on and off the system. It is contemplated that windows for collecting money are typically opened for a much shorter time than windows used for delivering the food. As such, different systems may be used at different windows depending on what the window is used for.

In thinking now about a typical drive through on a cold winter day, the system detects a car pulling into the lane to order. The thermostat tells us the temperature in the window area is below the expected temperature to service the drive through and the system starts the heater to pre-warm the area. The temperature for prewarming the area in anticipation of the window opening is set to be higher than the normal room temperature and the system activates. Once pre-heated, the system will turn off to minimize energy use.

Now the attendant is detected coming up to service the window, and the temperature is again sensed. If it has cooled below the threshold, the system again turns on the heater in anticipation of the window opening.

The sensors in the window detect when the window is open, and the heater is again turned on to compensate for heat loss while the window is open. The fan operation also pushed against any incoming draft or the entry of any exhaust fumes or odors. Once the window is closed, there is a short delay to warm the area and then the system will close the heater and fan defaulting back to the normal thermostat programming.

When the attendant leaves the area, the thermostat defaults to a lower programed temperature again to save energy. These settings are also tuned with the operating hours of the establishment allowing the space to cool below the normal threshold after hours, but not enough to allow the windows to ice up or frost over. The presence of an attendant signals both that the drive-up window is open, and an order is anticipated. If there is no attendant there is no need to pre-heat or over-heat the area.

To preserve energy and even condition behavior, a time limit as to how long the system will run can be set at times when the attendant leaves the window open for long periods of time, the system can shut down after a preprogrammed time interval, such as 1 minute, to encourage closing of the window as the order is prepared.

Instructions and operational guidelines play an important role to further save energy, and operators are instructed to follow procedures and are educated on the expense of operating the heater when the window is open needlessly.

The use of a variable speed fan based on temperature is used to limit energy use, but in addition this can be controlled when the window is open to limit noise. A very loud blower motor can affect the attendant's ability to hear orders and interact with the customer. Placement of the fan at a further distance and the employment of ducts is a way to limit noise.

Even when ideal temperatures have been reached, a small fan draft is left on to prevent entry of exhaust fumes or other odors from the outside by acting as a barrier. Further, if prevailing winds are present these can be detected or manually adjusted for by increasing the speed of the fan or adjusting vent openings and direction.

While the examples above had outlined a winter operation of a drive-up window, the same techniques can apply to extreme heat scenarios where hot air and humidity is kept out of the building and cooler air is driven into the area where the attendant is present.

In addition to drive up windows, such a system can also be employed around entrances and exits where frequent door opening occurs.

Further, some systems in a QSR, such as a hot grill or other heating elements can also adversely affect the cooling in the room. The use of similar air currents forming an air curtain around these devices prevents the rooms HVAC from cooling down the grill or other hot equipment and prevents such heat from warming up the adjacent room.

The system also allows for manual adjustment which can set both an energy budget as well as tuning to the desired comfort of the attendant.

Machine learning is also employed with respect to energy savings by increasing or decreasing the time of operation, the pre heat and pre cool times, the delay to turn off, the fan speed, and the temperature settings.

In another configuration, the system could utilize machine learning to learn the most active times for the QSR. For example, it could be that breakfast from 7-9 am is the busiest time for the establishment. As the startup of motors causes a spike in energy usage for instantaneous motor start up, it could be that the system learns that it is more energy efficient to maintain the system running during certain hours of the day or the system may have different shut down times based on how the equipment has been run historically during the day and months.

Likewise, automatic adjustment of setpoints can be implemented based on the measured outside air temperature and humidity along with historical run data.

Turning now to FIG. 1 we see a typical system with its various components is shown at a facility 1 which may be a quick serve restaurant or other location where a window/door opens frequently.

The Fan Blower 10 is shown with vents 18 pointing towards the window 30 and the attendant 40 to create an air curtain 12. The blower 10 also incorporates the variable speed motor as well as a relay to turn the blower 10 on and off.

An occupancy sensor 20 is deployed to detect the presence of the attendant 40. A window sensor 70 is deployed, and a temperature sensor 50 is placed in the area of the attendant 40 near the window 30.

Outside near the ordering equipment and intercom 90 automobiles 100 enter the ordering area and are detected with a motion sensor 80, which provides an indication that an order is to be placed and that the heating/cooling element 11 within the environmental control device (ECD) 16 should pre heat/cool. At the appropriate time, blower 10 should pre-warm the window space. When the ordering car 60 pulls up at the window 30 the system has already warmed the window space in anticipation of the window opening. Additional sensors can be used, for example window switch 75 may be depressed which may cause the variable speed motor to increase the rate of heat/cooling delivery or may turn the blower 10 on to deliver heat/cooling. The window switch 75 may be depressed to automatically open the window. The window sensor 70 may be employed in situations where the window does not open through motors or other mechanical means, but is rather manually opened. The vehicle/motion sensor 80 may also indicate that the vehicle has moved past the intercom 90, thus causing the system to pre-heat/cool. The temperature sensor 50 may be positioned in the drive through window area and a set point may be associated with that sensor such that the ECD 16 delivers heat/cooling when the occupancy sensor 20 senses the attendant 40 in the drive through window area. Further, in situations where the window sensor indicated the window is open, the ECD will typically be activated.

It is further understood that some drive through windows have multiple windows, for example, one window the attendant takes the order through the intercom 90 and collects payment, the next window can be used to deliver that person's food. The opening of each window can be expected at different times from the order being placed and may vary based on what is ordered. A one window system would involve the attendant taking the order via the intercom, collecting payment and then delivering the food through the window. Collecting payment and delivering food can be two separate events causing the window to open on each occasion, or one opening event, depending on what the operator does.

Figure 2:
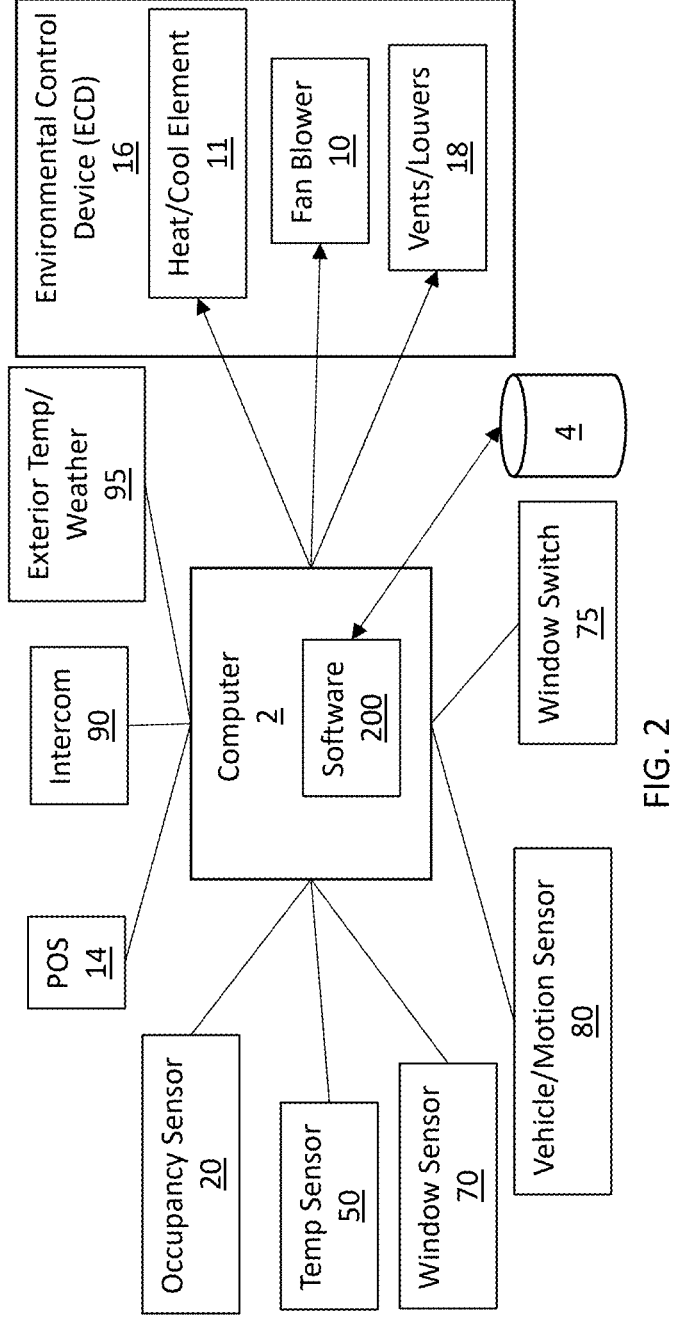
FIG. 2 is a functional flow diagram of the system of FIG. 1

FIG. 2 shows a functional flow diagram of the controller and senor arrangement of FIG. 1. The Computer 2 includes software 200 which communicates with a storage 4. The software runs logic which determines when the ECD 16 should be activated and in what states based on one or more sensor inputs. As can be seen, the Point of Sale (POS) system 14 and the intercom 90 both can communicate with the computer. Activity on these systems can indicate a new order which would be expected to cause the window to open the drive through window. The occupancy sensor 20, temperature sensor 50, window sensor 70 and window switch 75 may all be placed in the drive through window area inside the building. The vehicle/motion sensor 80 can be placed at the ordering/intercom 90 area and it is understood that additional sensors may be placed immediately outside the window 30.

Figure 3:
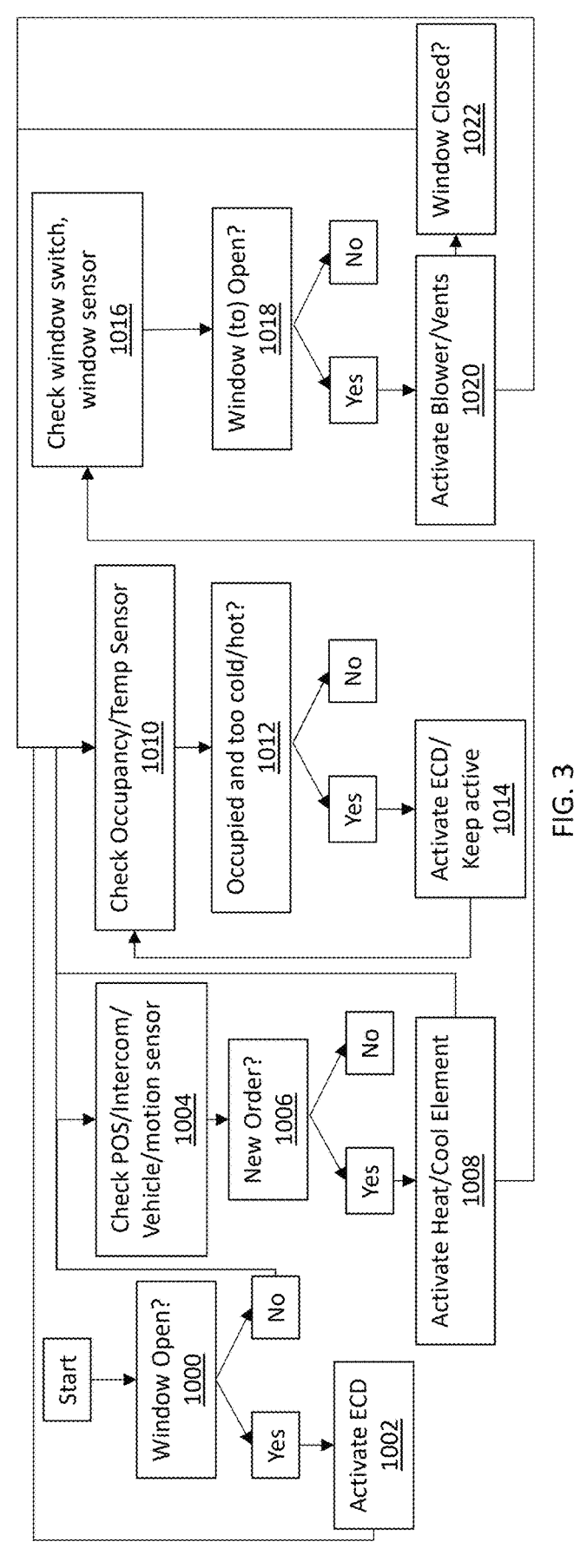
FIG. 3 is a logical flow depiction of one manner of operation of the system of FIG. 1

FIG. 3 provides an example logic flow for how/when the ECD 16 is activated. As a starting point, if the window is open 1000, the ECD will be activated 1002 unless of course the exterior temperature is close to the set point for the temperature such that opening of the window is not expected to cause significant energy transfer. Thus, while the window being open will normally default to activating the ECD, the temperature sensor 95 may be checked 1010 as shown resulting in a "NO" determination. Generally in FIG. 3, a "NO" determination that does not have a next arrow pointing to a next check would result in the ECD (or part thereof) being off unless other sensors indicate heat/cooling should be delivered to the area.

If the window is closed, the POS/Intercom/Vehicle sensors are checked 1004 to determine if there is a new order 1006. By checking these sensors this can simply mean that if the sensors provide data to the software 200 to indicate a state change of the window, the software would determine what to do next and if no data indicating a change is provided, the software keeps the ECD off. Here, if there is no new order determined, the ECD would generally not turn on (unless other sensors indicate it needs to be on). When a new order is determined, the heat cool element 11 will normally be activated 1008. This may include pre-warming a heater coil or pre-cooling a heat exchanger coil. The pre warming/cooling does not necessarily happen immediately. Particularly, based on how long it takes to pre warm/cool in comparison to the time it takes between order completion and window opening may be determined from historical data in the storage 4 which may be updated each time orders are placed and delivered and windows opened/closed. With the pre-heat/cool activated 1014, the system will then look for the window switch or window sensor 1016 activation to turn on 1020 the blower 10 and/or modify the position of the vents/louvers 18 to create the air curtain. Further, it is anticipated that given the variable speed motor for the blower fan 10, an amount of time after the order is placed a lower speed setting is used to begin warming the area of the window in anticipation of the window opening. Thus, when the window is actually opened 1018, the fan speed may increase and vent positioning may be modified to create the air curtain 12. Further, while activated, the occupancy/temperature sensors can be checked 1010 to determine if the appropriate amount of heat/cooling is delivered relative to the set point. Once the window closes 1022, the temperature/occupancy sensors are also checked 1010 to determine if further heating/cooling is needed. For example, if the attendant left the area following order completion and is not expected to return, the ECD 16 may be turned off. However, if that attendant is remaining in the window area, it would be desired to bring the space back to the set temperature if it is too cold/hot 1012.

It is further understood that although the sensors are shown in groups 1004, 1010, 1016 as causing certain results in terms of operation of the ECD, the sensors may operate in a further logical hierarchy. For example, the intercom may indicate a vehicle is placing an order due to two way communication. This may not automatically cause the ECD to start to pre heat/cool as the customer may not order. Thus, the POS can confirm the customer ordered and can also provide the software with information about what was ordered. It can be expected that larger orders may result in the window opening more times for a given order. The motion sensor can also be strategically placed as the intercom and order may be a certain distance from the window, and depending on the time to pre-heat/cool it may be appropriate to delay that command until the vehicle reaches a certain point. Furthermore, if the POS indicates multiple orders in succession, this would indicate the window will open and shut repeatedly over for a relatively predictable amount of time due to the volume of orders, and thus mean that the system should expect to need to deliver the heating/cooling more frequently or otherwise deliver heated/cooled air in a more continuous manner.

Furthermore, the indications from the POS device can also indicate how the occupancy sensor is used to control the ECD. Namely, if there are many back to back orders, the occupancy sensor may indicate the attendant has left the area, but this could be because that attendant is helping to fulfill the order and has left the station next to the window to do so, but that the attendant will be back shortly, thus the ECD should not stop delivering heated/cooled air. At the same time, if the occupancy sensor indicates that the attendant is in the drive through window area but there are no orders, that individual should not be there and excess heating should not be used as the window is not set to open. It is conceivable that an alarm or a sound can be used to discourage the use of the window switch or other temperature adjustments.

Furthermore, if the window is kept open with no orders coming or the temperature sensor keeps indicating a need for more heat/cooling despite no orders from the POS, this can indicate that something is wrong with the window closing mechanism or that the window is needlessly being opened and wasting energy. If the window has an automated closing mechanism, this may be activated to close the window rather than turning on or keeping the ECD on. Furthermore, the vents 18 may be manipulated to direct the heated/cooled air differently, depending on the status of the window. For example, if the window is open, the vents may be configured to create the air curtain, whereas the closed window may cause the vents to direct the heated/cooled air more directly at the attendant's station. Additionally an audible alarm or a signal sent to request maintenance can be generated by the system.

A number of examples provided have been specific to a drive through window, but it is contemplated that the control and logic system may be employed in any situation where a space is opening and closing frequently, e.g. via a door or window or the like.

Although the invention has been described with reference to a particular arrangement of parts, features, and the like, these are not intended to exhaust all possible arrangements or features, and indeed many other modifications and variations will be ascertainable to those of skill in the art.

What is claimed is:

1. A drive through window energy management system comprising:

a sensor which determines an open or close status change of a drive through window;

an environmental temperature control device positioned to deliver heat or cooling to an area including a drive through window area and/or an area adjacent to the drive through window, the environmental temperature control device is activated by a command generated based on the sensor detecting the status change of the drive through window;

wherein the environmental temperature control device delivers heat or cooling to the area to reduce temperature changes due the drive through window being open when the sensor indicates an open status and to turn off the environmental temperature control device when the sensor indicates a closed status in order to reduce energy usage.

2. The system of claim 1 wherein the open status change is indicative of the window expected to be opened in the future such that the environmental temperature control device can be pre heated or pre cooled to pre heat or pre cool the area in order to reduce temperature fluctuations.

3. The system of claim 1 wherein the closed status change is indicative of the window having closed recently such that the environmental temperature control device continues to heat or cool the area for a period of time.

4. The system of claim 3 wherein the environmental temperature control device continues to heat or cool the area until a predetermined temperature is reached.

5. The system of claim 1 wherein the drive through window is part of a facility including food and/or drink preparation and the drive through window is positioned at an opening with a bottom of the opening elevated relative to an adjacent driving surface so that a vehicle occupant can obtain food and/or drink through the drive through window.

6. The system of claim 5 wherein the environmental temperature control device includes a fan whose exhaust is oriented to deliver a hot or cold air curtain that separates an exterior zone outside the window from at least part of the facility.

7. The system of claim 6 wherein the at least part of the facility is the area.

8. The system of claim 1 wherein the sensor provides in information indicative of an order having been placed which is indicative of an open status of the window which is an open status expected in a near future.

9. The system of claim 8 wherein the sensor is a point of sale device which received the order.

10. The system of claim 1 wherein the at least one sensor includes a vehicle position sensor which identifies a vehicle adjacent or approaching the drive through window.

11. The system of claim 1 wherein the environmental temperature control device includes a fan and the at least one sensor is a door opening sensor which activates the fan to create an air curtain at or adjacent the drive through window.

12. The system of claim 1 further comprising a temperature sensor which allows the processor to determine temperature information indicative of a temperature of the area and wherein the command is determined based on the temperature information.

* * * * *